March 31, 1953 E. J. QUINBY ET AL 2,633,297
STROBOSCOPIC INDICATOR
Filed Dec. 29, 1950 3 Sheets-Sheet 1
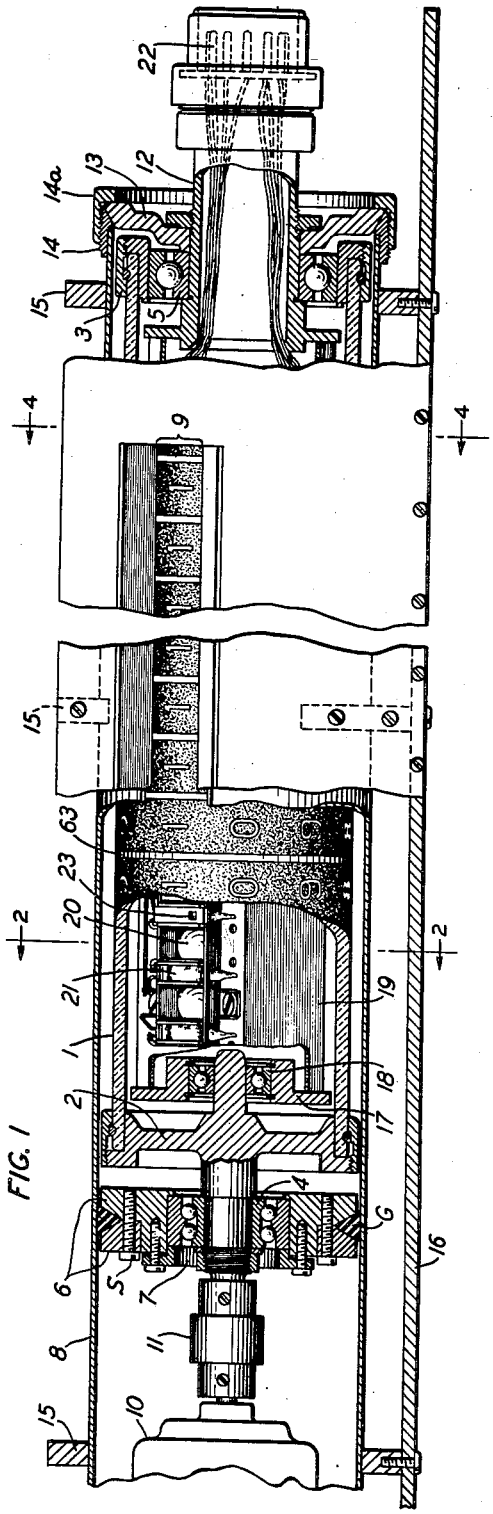
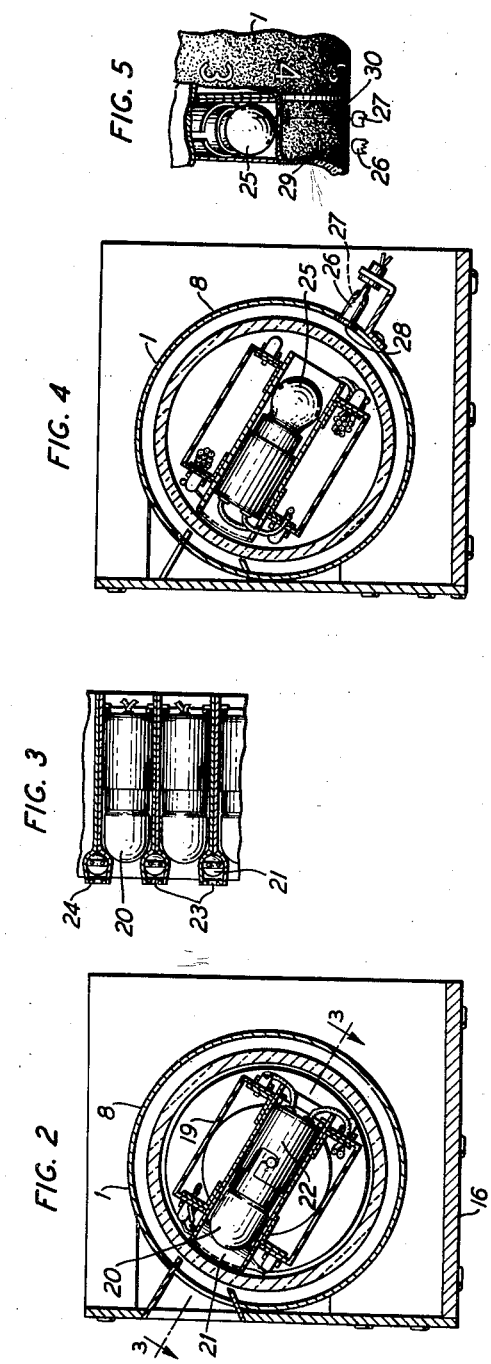
INVENTORS: EDWIN J. QUINBY
RUDOLPH BENDER
WALTER S. OLIWA
BY George H. Lorch
ATTORNEY March 31, 1953        E. J. QUINBY ET AL        2,633,297
STROBOSCOPIC INDICATOR
Filed Dec. 29, 1950                                            3 Sheets-Sheet 2
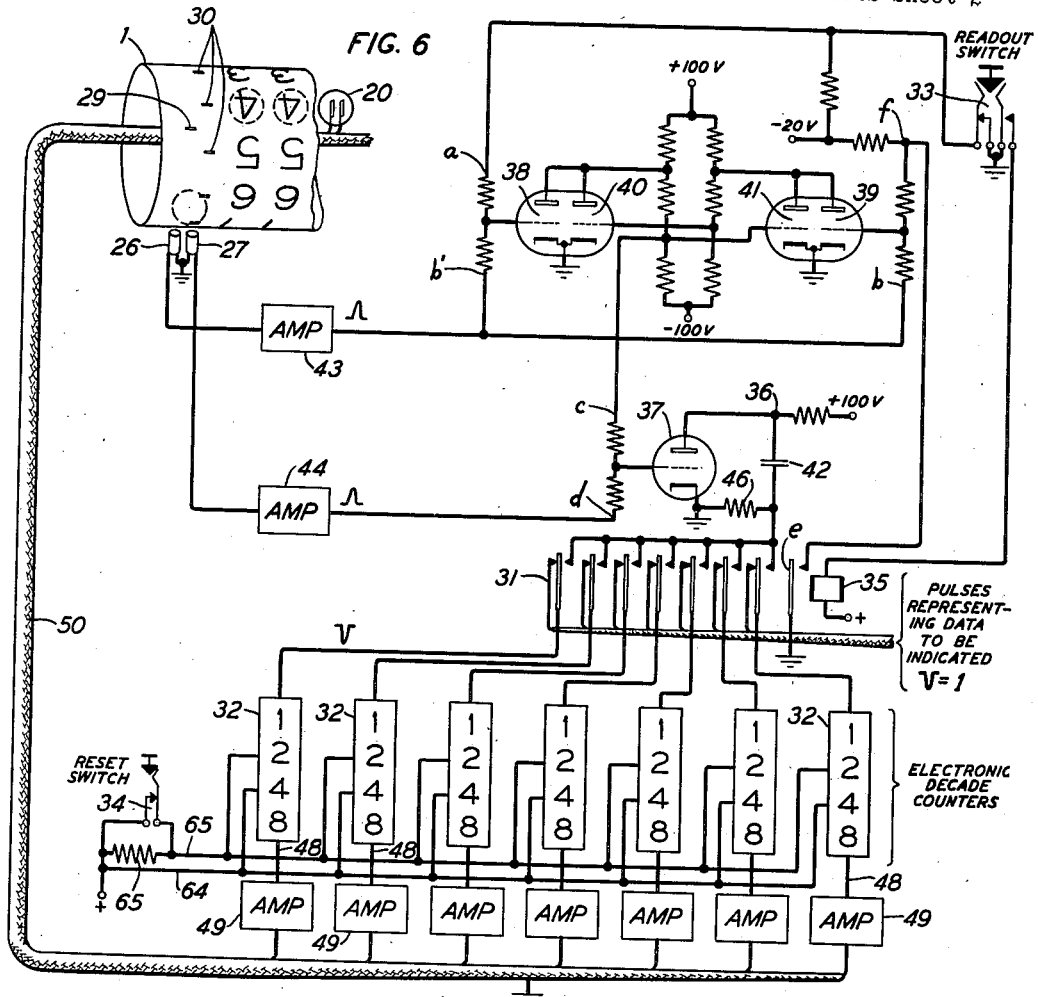
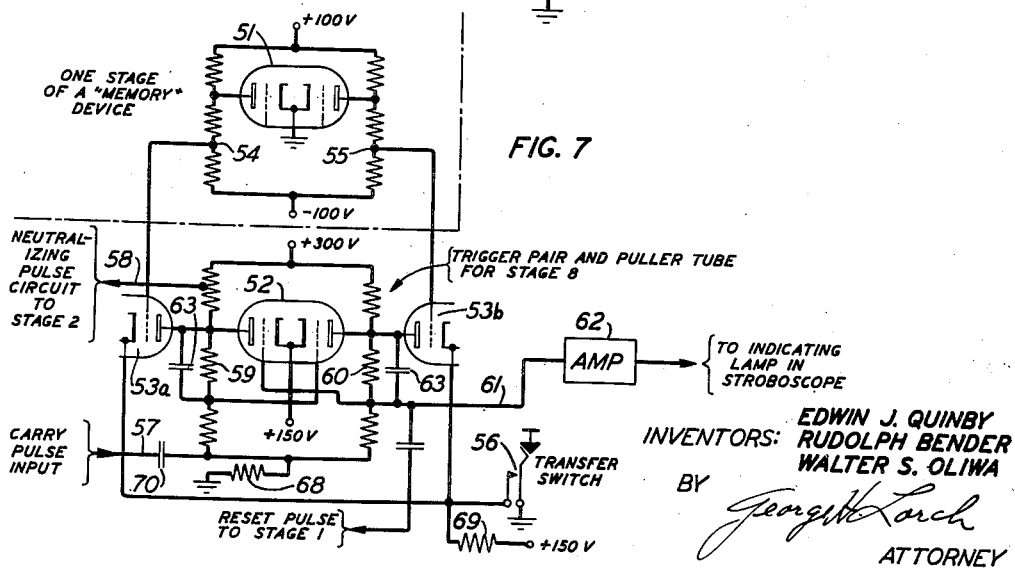
INVENTORS: EDWIN J. QUINBY
RUDOLPH BENDER
WALTER S. OLIWA
BY George H. Lorch
ATTORNEY March 31, 1953     E. J. QUINBY ET AL     2,633,297
STROBOSCOPIC INDICATOR Filed Dec. 29, 1950     3 Sheets-Sheet 3

FIG. 8

LAMP FLASHES ARE TIMED BY EACH DECADE COUNTER ACCORDING TO ITS PROGRESSION FROM 9 TO 0.

| | | | | | | | DISPLAY OF NUMERALS ON DRUM* |
|---|---|---|---|---|---|---|---|
| EXAMPLE OF ITEM STORAGE IN DECADE COUNTERS | 2 | 4 | 7 | 1 | 0 | 9 | |
| FIRST START PULSE FROM PHOTOCELL 26 → | | | | | | | |
| | | PROGRESSION | OF | DECADE | COUNTERS | | |
| 1 | 3 | 5 | 8 | 2 | 1 | (0) | 9 |
| 2 | 4 | 6 | 9 | 3 | 2 | 1 | 8 |
| 3 | 5 | 7 | (0) | 4 | 3 | 2 | 7 |
| 4 | 6 | 8 | 1 | 5 | 4 | 3 | 6 |
| COUNT OF PULSES FROM PHOTOCELL 27   5 | 7 | 9 | 2 | 6 | 5 | 4 | 5 |
| 6 | 8 | (0) | 3 | 7 | 6 | 5 | 4 |
| 7 | 9 | 1 | 4 | 8 | 7 | 6 | 3 |
| 8 | (0) | 2 | 5 | 9 | 8 | 7 | 2 |
| 9 | 1 | 3 | 6 | (0) | 9 | 8 | 1 |
| 10 | 2 | 4 | 7 | 1 | (0) | 9 | 0 |

CYCLIC START PULSE FROM PHOTOCELL 26 →

*VIEWING SIDE OF DRUM MOVES UPWARD

INVENTORS: EDWIN J. QUINBY
RUDOLPH BENDER
WALTER S. OLIWA

BY George H. Lorch

ATTORNEY

Patented Mar. 31, 1953

2,633,297

UNITED STATES PATENT OFFICE 2,633,297

STROBOSCOPIC INDICATOR

Edwin J. Quinby and Rudolph Bender, New York, N. Y., and Walter S. Oliwa, Orange, N. J., assignors to Monroe Calculating Machine Company, Orange, N. J., a corporation of Delaware Application December 29, 1950, Serial No. 203,286

5 Claims. (Cl. 235—92)

This invention relates to stroboscopic indicators and more particularly to a system for conveniently indicating statistical data. The statistics may, for example, be derived from an electronic computor at any stage of its operation or from any operating section thereof.

It is desirable to provide an instantaneous visible indication for the values at the output of an electronic computor and/or of the values resulting from intermediate steps in a calculating process.

Because of the unusual speed at which electronic calculators are driven, as compared to the speed of mechanical calculators, it becomes desirable to provide some sort of indicator which will be instantaneous in performance or at least that will appear to be instantaneous, and which will match the speed of the electronic calculator.

Accordingly, it is an object of this invention to provide a visual indicator of the stroboscopic type which shall have many advantages over forms of indicator heretofore known.

Other objects include the following:

To provide a novel readout device for use in conjunction with an electronic computor or the like, To enable a numerical value currently resting in any section of a computing machine or data storage device to be instantly brought into view, To provide a setting device for a numerical indicator which shall be practically instantaneous in action and capable of matching the speed of the computing machine with which it may be operatively associated, To provide a stroboscopic indicator which has only one moving part such as a continuously revolving drum the cylindrical surface of which is marked to display different numerals or other characters by intermittent back lighting, such as with gaseous lamp bulbs, To provide a means for repeatedly illuminating selected characters on the cylindrical surface of a constantly rotating indicator drum, the duration of each flash of light for such illumination being so short as to produce the appearance of stationary characters, the flash repetition rate being adjusted to effect the appearance of continuity and to take all possible advantages of the persistence of human vision, To provide a circuit arrangement for the gating of pulses into the lamps of a stroboscopic indicator of the type indicated above, the gating operation being such as to enable different numerals to be viewed simultaneously along a straight line, To provide a numerical indicator which is particularly applicable to an electronic computer and which effectively takes the place of revolving numeral wheels as heretofore generally used in mechanical calculators.

A preferred form in which the invention may be carried out will now be described in detail, reference being made to the accompanying drawings in which Fig. 1 is a front view of the mechanical structure of a stroboscopic indicator, certain portions being broken away and certain portions being shown in section in order to exhibit the interior arrangement, Fig. 2 is a cross section taken along the line 2—2 in Fig. 1, Fig. 3 is a cross section taken along the line 3—3 in Fig. 2, Fig. 4 is a cross section taken along the line 4—4 in Fig. 1, Fig. 5 is a fragmentary view of the drum periphery and of an optical scanning system which provides synchronizing pulses in response to photoelectric action, Fig. 6 is a diagram showing circuit gating means for controlling the indicator, Fig. 7 is a circuit diagram showing a modification, and Fig. 8 is a chart showing illustratively how the lamps in different denominational orders of an indicator may be flashed at proper times for indicating the numerals of a readout.

Indicator structure

Referring first to Fig. 1, we show a cylinder 1 of transparent material supported by end members 2 and 3 and by ball bearings 4 and 5. The supporting means for the bearings is contained within a cylindrical housing 8.

At the left end of Fig. 1 it is shown that the end member 2 extends through the center of a ball race 4, the latter being retained in a pair of disks 6 and held in place by a flange 7. A preferred method of retaining the disks 6 in place is carried out by forming a V-groove between them and filling the groove with a rubber grommet G. The disks are then screwed together by means of screws S. The grommet is thus expanded so as to make a tight hold against the inner wall of the housing 8. The members 6 and 7 are stationary, as is the outer cylindrical housing 8. At the front of the cylindrical housing is a long window opening 9 for viewing numbers or other characters on the rotatable member 1. The end member 2 is extended through the ball race 4 and is coaxially disposed with respect to the rotor of a motor 10, the motor shaft being coupled thereto by means of a suitable coupler 11.

At the right end of Fig. 1 there is shown a stationary supporting tube 12 for the ball race 5, the tube 12 being in turn supported by a flange 13 and a threaded ring 14 at the end of the cylindrical tube 8. The threads of the ring 14 (integral with tube 8) are meshed with the internal threads of a cap 14a, having a large opening therein.

At the two ends of the cylindrical member 8 are further end supports 15 which are attached to the base 16 of the indicator. For the purpose of insuring rigidity of the entire structure, additional supporting members 15 may be spaced intermediate those at the ends.

The tubular member 12 at the right hand end serves also to support certain stationary portions of the apparatus internally of the rotatable indicator drum 1. At the left end this stationary internal structure is also held centrally disposed with respect to the rotatable cylinder 1 by means of a flange 17 having a ball race 18 therein, the latter being supported by a stud portion of the member 2.

It will be seen from the preceding paragraphs that the indicator drum 1 may be kept in continuous rotation by the motor 10 while within the drum there is an assembly of components which is to be held stationary.

Within the indicator drum 1 there is shown an elongated housing 19 for a plurality of lamps 20, 21, and 25. These lamps are of three types, lamps 20 being for flashing the numbers to be indicated, lamps 21 being for designation of any selected decimal point between two orders of numerals, and lamp 25 being a constant light source from which a beam is emitted and is repeatedly intercepted by a masking portion of the drum 1, so as to obtain pulse control of two photoelectric devices 26, 27.

Each of the lamps 20 is held in place by a bayonet socket 22 as shown in Fig. 2, and each of the lamps 21 is held in place by having its tip dropped through a hole in the wall of the housing member 19.

There are channels in the housing member 19 that are sufficient to accommodate all of the separate wires necessary for individual excitation of the lamps 20 and 21. These wires are brought out to the prongs 22 which are suitably arranged for connection of a female connector member, not shown.

The indicator cylinder 1 has a coating which obstructs the outward passage of light from any of the lamps, but this coating is removed to form the characters to be indicated, and also is removed in unbroken bands around the cylinder at points opposite the decimal-indicating lamps 21. Any one of the decimal indicating lamps may be lit continuously during a display of numerals. The light beam from a decimal indicating lamp punctuates a translucent ring 63 in the drum 1, but is restricted by a small opening 23 in a mask 24, as best shown in Fig. 1 and also in Fig. 3 in cross section.

The lamps 20 are of the gaseous type so that they can be flashed for extremely brief periods of time. The rotation speed of the drum is suitably chosen to provide a stroboscopic effect when each lamp is flashed only once per revolution. The exact instants at which a lamp may be repetitively flashed is controlled by certain circuit means presently to be described. This circuit means is in turn controlled by pulses which are derived from photo-electric sensing of small translucent slits 29, 30 at one end of the drum 1. Before describing the photoelectric sensing means, it should first be explained that the action of the timing circuits in producing a stroboscopic effect for selective flashing of the lamps is such that any selected numeral in any digital order of the indicator may be made to appear.

In the window opening 9 the figure "1" appears in each order of digits. If the number to be indicated is expressed as a row of "1's," all of the lamps 20 in the horizontal alignment will be illuminated simultaneously at the precise instant when the "1's" are centered for viewing through the window 9. The lamps will all be extinguished simultaneously before the next number is to be brought into view. Each lamp after being flashed will remain extinguished until the drum makes one complete revolution. The flashing is, therefore, repetitive at a constant rate of once per revolution of the drum. The flashing is repeated as long as it is desired to view the indicator for reading any particular number. If, for example, the number 247,109 is to be registered, different timing will be obtained for the initial flashing of the different numerals in different digital orders. Since, however, the drum speed is such that the natural vision retention properties of the human eye span the time intervals intervening between successive flashes, the observer gains the advantage of this persistence-of-vision effect and views the differently illuminated numbers the same as though they were constantly illuminated. The difference in initial timing of the different cycles of flashes for different numerals is not observed because of the rapidity with which the flashes recur.

*Photoelectric sensing*

It was mentioned above that each of the lamps 20 must be selectively flashed at times which are coordinated with the passage of selected numerals in front of the window 9. The coordination of the flash cycles with the rotation of the drum 1 is obtained by means of a lamp 25 which is steadily illuminated and two photoelectric cells 26 and 27 which are mounted externally of the stationary cylindrical housing 8. In this housing 8 there is an opening 28 through which a light beam from the lamp 25 is allowed to pass upon the passage of any clear slits 29 and 30 across a plane in which are positioned the filament of the lamp 25 and the centers of the photoelectric cells 26 and 27. In the complete circumference of the drum 1 there is only one transparent slit 29, whereas there are ten equally spaced slits 30.

Photoelectric cell 26 responds once per revolution when light strikes it through the slit 29. This gives a reference time with respect to which pulse counts are initiated and cyclically repeated. The arrangement of the numerals on the drum and the direction of rotation of the drum is suitably determined so as to display any selected numeral according to the number of pulses counted between the reference timing instant and the instant when the numeral itself will appear through the window 9. The pulse count is in a complementary sense with respect to the numeral to be displayed. Thus, if the numeral "7" is to be displayed, it is necessary to count three of the ten-per-revolution pulses after excitation of the photoelectric cell 26. At the third pulse the lamp 20 is flashed, this time being coincident with the alignment of the numeral "7," with the window. If the numeral to be indicated is a "4," then six pulses must be counted by the photoelectric cell 27.

The translator circuit arrangement

Fig. 6 shows diagrammatically a preferred form of translator circuit arrangement. The pulses representing data to be indicated may be derived from any source where counting pulses are available. For example, a train of pulses individual to each order of digits may be transmitted from the data source through digit order conductors 31 and through back contacts of relay 35 to separate electronic decade counters 32. In the circuit arrangement shown, these pulses must be negative. They cause each decade counter to store a binary indication corresponding to the number of delivered counting pulses. Electronic decade counters are well known in the art. One type of such a decade counter is shown and described in a paper by John T. Potter, published in the June 1944 issue of "Electronics." In view of this reference, it is unnecessary to show details otherwise than in the block form 32, Fig. 6. Another method of introducing information into these decade counters is known and will be explained hereinafter with reference to Fig. 7.

Reverting, however, to Fig. 6, any time may be optionally chosen for injection of the pulses into decade counters 32 in anticipation of a visual readout operation to be obtained by the functioning of the stroboscopic indicator proper. This operation is to be initiated by a readout switch 33 having make and break contacts for shifting a ground connection from one to another circuit.

Before injecting the data pulses into the decade counters, these counters must be reset to zero. This is done by means of a reset switch 34 in a manner also shown and described in the Potter article above cited. The anode potential is, according to the Potter system, carried directly to left-side anodes of each trigger pair in the four-tube counter decade. In Fig. 6 we show a conductor 64 for this purpose. The right side anodes are normally supplied with the same potential carried through the short-circuiting contacts of the next switch 34 and through conductor 65. On momentarily opening of these contacts the resistor 66 causes a reduction of anode potential on the right side of each trigger pair which drives the grids of all left hand triode sections negative so that each trigger pair is preset with all right hand sections conducting.

The readout switch 33 when operated causes a relay 35 to be energized for grounding a junction point $f$ on a voltage divider associated with triode 39, and also for the purpose of opening all of the circuits from the data source to the electronic decade counters 32. By means of the transfer contacts of relay 35 all of these counters will now be coupled through a capacitor 42 to a junction point 36 in the anode voltage supply conductor for a triode gate tube 37.

It should be understood that in order to obtain repetitive flashing of the several ordinal lamps 20 at times which are coincident with the appearance of different numerals on the drum, each of the decade counters must be caused to go through a ten-pulse counting cycle, starting with the number that was initially stored therein. Although these cycles must be repeated as long as an indication is wanted, the transition from "9" to "0" will be variably timed so that the same number will appear at each of the flashing moments for the respective lamps 20 in response to the carry pulse. This requirement involves starting a ten-pulse cycle at the same instant for each of the decade counters.

At different times during each ten-pulse cycle, depending on the initial setting of each decade counter, the registration of counts will pass from "9" to "0." Each counter, independently of the others, delivers a carry pulse which is not used as such, but now has the function of timing the flash of an appropriate one of the lamps 20. Each lamp is, therefore, caused to be flashed at the precise instant when the number to be indicated appears through the window 9.

The operator of switch 33 has no control of the instant when counting cycles are to be initiated by the photoelectric cell 26. The depression of the switch button 33 therefore merely prepares a circuit for response to the photoelectric cell action.

Preparation of the translator circuit for readout

Before operating the readout switch 33, the translator circuit stands with the following conditions prevailing:

Point $a$ is grounded through contacts of switch 33 and renders the grid of triode 38 responsive to positive pulses derived from an amplifier 43 which, in turn, amplifies the pulses sensed by photocell 26 once per revolution of the drum 1. These are positive pulses as applied at points $b$ and $b'$. While they are effective in driving triode conductive, they only reduce the negative bias on the grid of triode 39 from, say, $-20$ v. to about $-10$ v. Thus the grid potential is held below cut-off by an approximate $-20$ volt bias at point $f$. Since triode 38 becomes conductive in response to the start signal from amplifier 43, its low anode potential reacts upon triode 41 and drives the same to cut-off.

The directly interconnected anodes of triodes 39 and 41 are at a low potential if either or both space paths are conductive. They are, however, now high because both triodes are non-conductive. Hence, a positive potential is delivered to the grid of triode 40 which renders the same conductive.

The immediately preceding description may be summarized thus: Triode 40 is conducting while triodes 39 and 41 are non-conducting. Triode 38 is made conducting in response to pulses from amplifier 43. This condition is reaffirmed once per revolution of the drum; that is, whenever the light slit 29 on the drum 1 emits a beam to be sensed by the photocell 26. Prior to the operation of switch 33, however, the above described preparatory circuit operates to prevent the cyclic advancement of the decade counter 32. That is to say, the counting pulse progression of the decade counter is held up until the first start pulse is derived from photocell 26 that follows the operation of the readout switch 33.

The readout switch control functions

Operation of switch 33 causes these changes to take place in the preparatory circuit: (1) ground potential is removed from point $a$, the potential of which is driven to $-20$ volts; (2) relay 35 is operated and opens the input circuits 31 through which the several electronic decade counters 32 were preset to represent the numerical value of each denominational digit to be indicated. The transfer contacts of relay 35 now close against their front contacts, all of which are connected to a common conductor 45; and (3) the grounded contact e on relay 35 closes against its front contact and raises the potential at point f from approximately —20 v. to ground potential. Conductor 45 is connected to ground through a resistor 46, and is also coupled through a capacitor 42 to a junction point 36 in the anode circuit of tube 37.

As a result of the changed conditions in the preparatory circuit due to the operation of the readout switch 33, the start pulses derived from the sensing operation of photocell 26 and amplified in the amplifier 43, combines with the ground potential control at point f to render triode 39 conductive. There is no effect on triode 38, however, because point a is held at approximately —20 volts, so that the grid of triode 38 rises no more than to —10 volts, which is below cut-off and the triode remains non-conductive.

The conductive state in triode 39 is reflected in the application of a cut-off bias in triode 40. It will now be seen that triodes 38 and 40 are both non-conducting so that the voltage at point c rises to ground potential, or zero volts. The grid in triode 41 is also maintained at ground potential, thus confirming the reflex application of a cut-off bias on the grid of triode 40, the same as was provided by the conductive state in triode 39. Now, upon the occurrence of each start pulse from photocell 26, triodes 38 and 40 are held non-conductive and triodes 39 and 41 are held conductive. Also, point c is maintained at ground or zero-volt potential.

*The cycling of the electronic decade counters*

Each of the decade counters 32 is now rendered responsive to counting pulses which originate with the sensing of light beams through the ten slits 30 in the drum 1 as they are scanned by the photocell 27. Each of these counting pulses, ten per revolution of the drum, is subjected to amplification in the amplifier 44. The output from this amplifier consists of positive pulses applied at point d and rendered effective in combination with the steady 0-volt potential at point c, so that triode tube 37 responds and is driven conductive. If, for example, the anode potential varies between a value of +90 volts when the tube is non-conducting and +50 volts when it conducts, then the output pulse applied negatively through capacitor 42 will be of a magnitude that is more than ample for advancing all of the counters 32 by one count.

These negative pulses are applied through capacitor 42 to the common conductor 45 and thence through front contacts of relay 35 to the input circuits leading severally to the different electronic decade counters 32. These counters, it will be recalled, were previously set to register in binary form the coded decimal equivalent of each digit to be exhibited. Each counter is now individually advanced from that initial count through a series of ten counts per revolution of the drum, the progression of counts being in the binary scale from "0" through "9." Each of the decade counters 32 has an output circuit 48 which corresponds with the carry circuit for ordinary use when one decade counter is to carry a 10's-count pulse to another decade counter of next higher order. In our indicator we have no need to use the carry pulse for this purpose except internally of each decade counter. Each carry circuit 48 leads to a separate amplifier 49 and the output from each amplifier is separately conducted to an individual lamp 20 in the indicator unit. With this arrangement it is provided that each of the lamps 20 will be cyclically flashed at times coincident with the appearance of the selected numeral on the drum 1 through the window 9, this numeral in every digit place being in correspondence with the initial count that was registered in the respective decade counter.

The correlation between the timing of carry pulses and the exposure of the desired numeral through the window 9 is best explained by reference to the diagram of Fig. 8. As an example of a number to be displayed, the number 2,471.09 has been chosen. These numerals will be understood to be set up in the decade counters before the readout switch 33 is operated. Upon operation of this switch, the first start pulse from photocell 26 conditions the translator circuit to respond to a continuous train of pulses from photocell 27. These pulses are applied simultaneously to all the decade counters and each counter is advanced progressively in cycles of ten steps per revolution of the drum so that each one of the counters reaches the zero, or carry position, after a number of counts which is a 10's complement with respect to the numeral to be indicated.

The number 2,471.09 to be indicated is shown on the top line of Fig. 8. This number, as explained above, is stored in the decade counters before the readout switch is operated. The advancement of each decade counter in response to the counting pulses initiated by the photocell after operating the readout switch and after the first start pulse from photocell 26 is in accordance with the numerals shown in the vertical columns below each digit of the number to be indicated. To the left of these columns is a column representing the count of each pulse in the pulse cycle generated by the photocell 27. The right hand vertical column headed "Display of Numerals on Drum" shows the numerals which are to appear by illumination of the figures on the drum. The viewing side of the drum moves upward and displays these numerals in reverse order. Each numeral, when it is displayed, is shown by the diagram of Fig. 8 to be on the same horizontal line with the zero count to be reached repetitively by the decade counters. In the table of Fig. 8 the zeros appearing in the counts registered as decade counter advancements are circled to show their coincidence with the numerals on the drum which are to be cyclically illuminated. The illumination is cyclic because the decade counters repeat their cycles as long as the readout switch 33 is held depressed. The cyclic rate is sufficiently high to take advantage of the persistence of human vision and thus to create, as nearly as possible, the appearance of a steadily illuminated indication of each selected numeral.

The selection of a single lamp 21 for indicating the position of the decimal point is a simple matter of closing an individual circuit to the lamp itself. This may be done automatically or manually, depending upon the design of the computer. The lamp 21, when selected, burns continuously and illuminates a small opening 23 in the masking element 24. The light emitted through this opening also penetrates a translucent band 67 on the drum 1.

*Alternative method of storing the data in the decade counters*

Referring to Fig. 7 there is shown therein a circuit arrangement which is designed to transfer the data to be indicated from a given source to the decade counters at one instant instead of by counting pulses. Only one stage of a memory device appears in the figure. It comprises a twin triode trigger pair 51 and associated circuit parameters including separate anode circuits for each of the two anodes and output circuit voltage divider sections connected thereto in the same manner as has been shown and described above with respect to the trigger pair 40, 41 (Fig. 6). The grid circuit connections for tube 51 are not shown because they are immaterial to the instant disclosure. It will be understood, however, that tube 51 may be set with either left side or right side conductance so as to indicate the storage of a "0" or a "1" as the case may be.

For the representation or storage of coded decimals, each denominational order of the number to be stored requires four twin triode trigger tubes like tube 51. If, therefore, the number to be stored has seven digits, as shown in Fig. 6, the full complement of storage tubes in the memory device will be 28 tubes such as 51. Each of the tubes in one denominational order of such a memory device will be associated with three others which are linked by carry circuits so that as a group it may constitute a decade counter in itself. The means for introducing control pulses to such a counter may be varied to meet the requirements of different computers or sections thereof and are irrelevant to the instant disclosure. For this reason they do not need to be described.

Twin triode tube 52 represents one stage of a decade counter. Four such stages are required in a decade counter such as 32 in Fig. 6. Tubes 52 and 51 are, therefore, equal in number and they are to be understood as occupying corresponding positions in the memory device and in the decade counter, where the latter constitutes a component of this invention.

Single pulse injection of the data into the decade counters

In order to transfer the information from an outside memory device to the decade counters 32, each of the four trigger pair tubes in each decade counter is to be individually controlled by means of a so-called puller tube. Triodes 53a and 53b represent the two halves of a twin triode puller tube. The anode of each puller triode is directly connected to a respective one of the anodes in the trigger pair tube 52. The grid in triode 53a is connected to a junction point 54 on the voltage divider associated with the left side of tube 51. Correspondingly, the grid in triode 53b is connected to a voltage divider junction point 55 on the right hand side of tube 51.

The puller tubes have their cathodes normally connected through a resistor 69 to a D. C. source terminal having a value of, say, +150 volts, which value is considerable positive at all times with respect to the grids in these tubes. Hence, they cannot conduct unless a transfer switch 56 is operated to impress ground potential on the cathodes. When this is done momentarily, either a 0-volt potential or a −20 volt potential is applied to the grid in triode 53a. In the case of a zero potential this triode becomes conductive in representation of the digit "1." If the potential at junction point 54 happens to be −20 volts, then triode 53a is cut off in representation of the digit "0." Zero potential at junction point 55 will at the same time cause triode 53b to conduct. The digit representation may, however, be reversed with respect to the conductive and nonconductive states of the two triodes 53a and 53b. In any case, when triode 53a is conducting, triode 53b will be driven to cut-off because of the cross coupling circuits between the anode of one triode and the grid of the other in the storage tube 51.

A conductive state in triode 53a produces a negative trigger pulse through voltage divider section 59, the same as though such action were to be caused by a conductive state on the left side of the trigger pair 52. The result is to drop the grid potential on the right side of tube 52 below cut-off. The trigger action is accelerated by the use of shunt capacitors 63 across the voltage divider sections 59 and 60. Triode 53b at this time is nonconducting because it is directly controlled by the anode on the right side of tube 51. So a positive pulse through voltage divider section 60 controls the grid in the left side of tube 52, driving the triode therein conductive. The trigger tube 52 therefore becomes a slave to the puller tube 53ab, the interconnected anodes being at low potential on one side and high on the other side. Thus it will be seen that the momentary operation of transfer switch 56 causes the same information to be stored in tube 52 as was found at that instant to be stored in tube 51.

Because there is an interconnection between the respective denominational orders of binary digit stages in the electronic decade counters 32, it is necessary to employ a carry pulse input circuit 57 by which a carry pulse may be transferred from a lower to a higher order stage in the decade counter, also from the highest order stage to the lowest order stage. The decade counter, if it is designed like that of the Potter disclosure hereinabove referred to, requires a neutralizing pulse circuit 58 to be connected between stage 8 and stage 2 of the decade counter so as to complete the counting cycle at count 10. The stage illustrated in Fig. 7 is called the number 8 stage because it is of the highest order in an individual decade counter. It therefore has an output circuit 61 which is used to reset itself to zero and which would normally be used for carry purposes if such a decade counter were to be linked with another of higher order. In addition to its normal function, the carry circuit 61 is here employed as a generator of lamp flashing potentials, its output being amplified in the amplifier unit 62. Thus the selective timing of flashes in the respective stroboscopic lamps 20 is individually controlled by each trigger pair 52 and the lamps are repeatedly flashed at the instants of delivery of the carry pulse to amplifier 62. The operation of Fig. 7 differs in no respect from that of Fig. 6 after the transfer switch 33 and the readout switch 56 are both manipulated. The difference between the two embodiments of the invention lies only in the manner of introduction of the data to be indicated into the decade counters themselves.

It will be understood by those skilled in the art that various modifications of the structural arrangement of the stroboscopic indicator may be adopted without departing from the spirit and scope of the invention. The circuit arrangement for timing the flash pulses, as herein shown and described, is merely one example of a suitable device for performing that function. Other circuit arrangements are capable of being substituted without involving invention over what is herein disclosed.

We claim:

1. Structure for a stroboscopic indicator comprising an elongated axially disposed stationary support having individual lamp compartments of two sizes, a lamp and socket therefor in each of the larger compartments, a smaller lamp and clip therefor in each of the smaller compartments, each of the smaller lamps being located to indicate a selected decimal point location, a cylindrical member mounted for axial rotation externally of said support and having transparent areas for the display of characters thereon, a motor for driving said member at a constant rate, an outer stationary housing windowed along a horizontal character display line, and lamp excitation means operable to produce a stroboscopic effect, whereby selected characters on said cylindrical member are made to appear stationary.

2. In a circuit arrangement for determining such instants of excitation of a series of flash lamps as will cause them to stroboscopically display selected numerals on the periphery of a constantly rotating drum, the cylindrical portion of which has transparent areas, a plurality of electronic counters, one for each order of numerals to be displayed, a statistical data source having means for initially setting each of said counters to represent a selected numeral, two pulse generators the first of which is synchronized with the revolutions of said drum and provides a start pulse for advancement of all the counters by the second, and the second of which bears a ten-to-one ratio to the drum revolutions and provides counting pulses for cyclic step-by-step advancement of all the counters, means including a read-out switch for conditioning the circuit arrangement to utilize the pulse output from both said generators, thereby to time the cyclic advancement of said counters, and a plurality of excitation circuits, each connected to a separate one of said lamps for supplying momentary power thereto at said instants, and under control of carry pulses originated by respective ones of said counters, each carry pulse being obtained repetitively upon advancement of the respective counter from nine to zero.

3. A visual indicator of the stroboscopic type having lamps individual to each digital order of a number to be displayed, said lamps being of the type wherein momentary ionization develops a luminous flash, and being stationarily mounted, a cylindrical member having transparent character-outlining portions and opaque background portions, said member being rotatable at a constant rate, thereby to present different characters successively to an observer, said member being mounted to surround said lamps, a plurality of electronic decade counters each individual to a respective one of said lamps, each counter of a particular ordinal designation having an output circuit for delivery of a so-called "tens carry pulse," a statistical data source and circuit means operable to obtain a preliminary registration in said counters of numerals corresponding to each digit of said number to be displayed, two pulse generators synchronized with respect to the revolutions of said cylindrical member, one generator having a pulse output rate of one per revolution and the other generator having a pulse output rate of ten per revolution, switching means operable at will to transfer control of said counters from said data source to the pulse generator which has a pulse output rate of ten per revolution of the cylindrical member, gating means responsive to the pulse output from the generator which delivers one pulse per revolution for initiating cyclic responses of said counters, and means for energizing each of said lamps individually and repetitively, this means being operable under the timing control of said "tens carry pulse" as delivered by each respective one of said counters.

4. In a cyclical exciter arrangement for stroboscopic lamps which are lighted momentarily each to display a selected character on a rotating member, a source of reference pulses providing one pulse per rotation of said member, a source of counting pulses providing ten pulses per rotation of said member, electronic counters presettable to represent digits to be displayed and advanceable by said counting pulses, each counter being provided with a tens carry output circuit arranged to excite a said lamp on each energization thereof, a display switch operable to display the settings of the counters, and gating means through which said counting pulses are applied to the counters, said means being enabled to pass said pulses by the first reference pulse occurring after said switch is operated, and being disabled by the first reference pulse following normalizing of the switch, said gating means comprising a coincidence gate through which said counting pulses are applied to said counters, a bi-stable flip-flop connected to said gate and effective when in one state to prime the latter for operation by said counting pulses and when in the other state to prevent operation of the gate by said counting pulses, a pair of coincidence gate puller tubes one to set the flip-flop to one state and the other to reset the flip-flop to the opposite state, both pullers being connected to said source of reference pulses to be operated thereby, a bias source connected to said pullers to prevent operation thereof, a source of potential for priming said pullers for operation by said reference pulses, and a pair of circuits completed alternatively by said display switch each for by-passing the said bias source as connected to one puller and connecting the latter with said source of priming potential.

5. The combination according to claim 4 and including a plurality of indicating lamps interposed in alignment with said momentarily excitable lamps, each said indicating lamp being individually selectable to show a decimal point position when lit.

EDWIN J. QUINBY.
RUDOLPH BENDER.
WALTER S. OLIWA.

REFERENCES CITED

The following references are of record in the file of this patent:

UNITED STATES PATENTS

| Number | Name | Date |
| --- | --- | --- |
| 1,933,650 | Bascom | Nov. 7, 1933 |
| 2,432,453 | Skellett | Dec. 7, 1947 |
| 2,510,093 | Ferguson et al. | June 6, 1950 |
| 2,510,485 | Vossberg | June 6, 1950 |
| 2,537,427 | Seid et al. | Jan. 9, 1951 |